United States Patent [19]
Quin

[11] Patent Number: 5,901,270
[45] Date of Patent: May 4, 1999

[54] APPARATUS FOR HOT FLUID TRIMMING OF PLASTIC MOLDED ARTICLES

[75] Inventor: Willoughby Marshall Quin, New Haven, Conn.

[73] Assignee: The Plastic Forming Company, Inc., Woodbridge, Conn.

[21] Appl. No.: 08/711,888

[22] Filed: Sep. 12, 1996

[51] Int. Cl.⁶ .................... B29C 71/02; B29C 37/02; B26F 1/26; B26F 3/06
[52] U.S. Cl. .................... 392/382; 392/379; 83/170; 83/914; 264/161; 425/806
[58] Field of Search .................... 392/382, 379; 425/527, 810, 806; 264/161; 83/170, 171, 15, 16, 914

[56] References Cited

U.S. PATENT DOCUMENTS

| | | |
|---|---|---|
| 2,670,645 | 3/1954 | Pipper et al. . |
| 3,055,047 | 9/1962 | Preissler . |
| 3,543,619 | 12/1970 | Hellmer et al. .................... 264/161 |
| 3,702,789 | 11/1972 | Dungan . |
| 4,279,584 | 7/1981 | Hawryl . |
| 4,518,551 | 5/1985 | Lin . |
| 4,535,223 | 8/1985 | Westerman, Jr. . |
| 4,535,224 | 8/1985 | Westerman, Jr. . |
| 4,549,066 | 10/1985 | Piccioli et al. . |
| 4,670,210 | 6/1987 | Boggs .................... 264/161 |
| 4,738,605 | 4/1988 | Aerts et al. . |
| 4,894,958 | 1/1990 | Takasaki . |
| 5,273,422 | 12/1993 | Quin .................... 264/161 |
| 5,431,865 | 7/1995 | Quin .................... 264/161 |

FOREIGN PATENT DOCUMENTS

| | | |
|---|---|---|
| 295458 | 12/1988 | European Pat. Off. . |
| 985944 | 7/1951 | France .................... 392/379 |
| 2504447 | 10/1982 | France . |
| 2526263 | 12/1976 | Germany . |
| 3001370 | 7/1981 | Germany . |
| 19530417 | 2/1997 | Germany . |
| 61-98519 | 5/1986 | Japan . |
| 2-158319 | 6/1990 | Japan . |
| 5-154851 | 6/1993 | Japan . |
| 6-71658 | 3/1994 | Japan . |
| 6-134771 | 5/1994 | Japan .................... 425/806 |
| 9-193235 | 7/1997 | Japan . |
| 288056 | 3/1965 | Netherlands . |
| 1390050 | 4/1988 | U.S.S.R. . |
| 1390051 | 4/1988 | U.S.S.R. . |

*Primary Examiner*—John A. Jeffery
*Attorney, Agent, or Firm*—Bachman & Lapointe, P.C.

[57] ABSTRACT

An apparatus for trimming sharp edges from a non-round workpiece having a contour includes a member for trimming the workpiece by impinging a stream of heated gaseous medium on the workpiece; a member for holding the workpiece, the member for holding being rotatably mounted relative to the member for trimming relative to the member for holding; and a cam for guiding the member for trimming, the cam cooperating the member for holding with the member for trimming so that the member for trimming follows the contour of the workpiece when the member for holding is rotated relative to the member for trimming.

29 Claims, 5 Drawing Sheets

APPARATUS FOR HOT FLUID TRIMMING OF PLASTIC MOLDED ARTICLES

BACKGROUND OF THE INVENTION

The invention relates generally to the field of molding of plastic articles and, more particularly, to a method and apparatus for trimming molded plastic articles.

Procedures for blow molding double wall plastic articles typically involve the formation of flash or excess material around the perimeter of the part being formed. This flash is pressed thin, or "pinched off" by means of metal to metal contact areas of the opposing mold halves, at the mold parting line and adjacent to the mold cavity or cavities. This pinchoff area is typically relatively wide, on the order of 0.025 to 0.050 inches. When the flash is torn or cut from the molded part, a significant amount of the pinched flash remains attached to said part and must be subsequently removed by mechanical trimming.

In response to the pinchoff problem, a mold construction was developed which is known as "zero land" construction whereby the amount of flash is greatly reduced. However, when the flash is removed from the part, the remaining parting line edge is sharp. This sharp edge is unacceptable in some instances. For example, plastic cases manufactured to hold children's toys cannot have sharp edges due to the risk of injury to children.

In both of the above processes, pinchoff and sharp edges have traditionally been removed by hand with a knife. This hand trimming causes several problems, such as the direct increase in labor cost, inconsistent trimming quality and the possibility of repetitive motion syndrome in the wrists of the hand trimmers.

Another approach has been to heat trim the edges of "zero land" molded articles with a hand held propane torch. This method produces acceptably rounded edges of the articles but still involved the above-described problems associated with hand trimming.

It is therefore desirable to trim blow molded plastic articles in a procedure which does not involve substantial additional labor costs, which produces consistent quality trimming, and which does not pose the risk of injury to operators.

U.S. Pat. Nos. 5,273,422 and 5,431,865 assigned to the assignee of the present application provide an excellent alternative for addressing the foregoing problems in the industry. However, each of these patents, as well as the use of a hand torch, involve the use of a torch for impinging a flame on the workpiece, and therefore require a source of fuel such as propane and the like for the torch. Keeping and using such fuel, however, leads to apprehension in personnel as well as additional precautions which must be taken to ensure safe storage, handling and use of highly combustible materials.

It is therefore the primary object of the present invention to provide an apparatus for trimming blow molded plastic articles which does not involve the use of flame and highly combustible fuel materials.

It is a further object of the present invention to provide an apparatus for trimming plastic articles which produces consistent quality trimming of sharp edges of plastic molded articles.

It is still a further object of the present invention to provide an apparatus for trimming molded plastic articles which does not involve repetitive hand motions of operators and which, therefore, does not pose the risk of repetitive motion syndrome.

It is another object of the present invention to provide an apparatus for trimming which protects hinge portions and other areas of the article during trimming.

Other objects and advantages will become apparent to those skilled in the art upon a consideration of the following disclosure of the invention.

SUMMARY OF THE INVENTION

In accordance with the invention, the foregoing objects and advantages are readily attained. According to the invention, an apparatus for trimming a molded plastic article, or workpiece, is provided which comprises means for trimming the workpiece by impinging a stream of heated gaseous medium on the workpiece; means for holding the workpiece, said means for holding being rotatably mounted relative to said means for trimming; and cam means for guiding said means for trimming relative to said means for holding, said cam means cooperating said means for holding with said means for trimming so that said means for trimming follows said contour of the workpiece when said means for holding is rotated relative to said means for trimming.

According to the invention, said means for trimming the workpiece preferably comprises a nozzle for directing a stream of heated gaseous medium, and preferably further includes gaseous medium supply means for defining a flow path associated with a source of said gaseous medium under pressure, and heater means positioned along said flow path for heating said gaseous medium in said flow path.

Further according to the invention, the means for trimming preferably comprises a nozzle mounted on a carriage, a cam follower mounted on said carriage and disposed in registry with said cam, and means for biasing said carriage toward said cam. The cam follower may preferably comprise an arm mounted on the carriage and having a wheel, rotatably mounted on the arm, said wheel being biased against said cam by said biasing means.

Still further according to the invention, an apparatus is provided for trimming sharp edges from a non-round workpiece having a contour and a portion which is not to be trimmed, which apparatus comprises means for trimming the workpiece; means for holding the workpiece, said means for holding being rotatably mounted relative to said means for trimming; and cam means for guiding said means for trimming relative to said means for holding, said cam means comprising a cam mounted relative to said means for holding for rotation therewith, said cam having a cam contour selected to guide said means for trimming at a spacing of said means for trimming from said contour of the workpiece, said cam contour including an extended portion in registry with said portion of the workpiece which is not to be trimmed, said extended portion serving to increase said spacing of said means for trimming from said contour of the workpiece at said portion which is not to be trimmed.

BRIEF DESCRIPTION OF THE DRAWINGS

A detailed description of the preferred embodiments of the invention follows, with reference to the accompanying drawings, in which.

DETAILED DESCRIPTION

Figure 1:
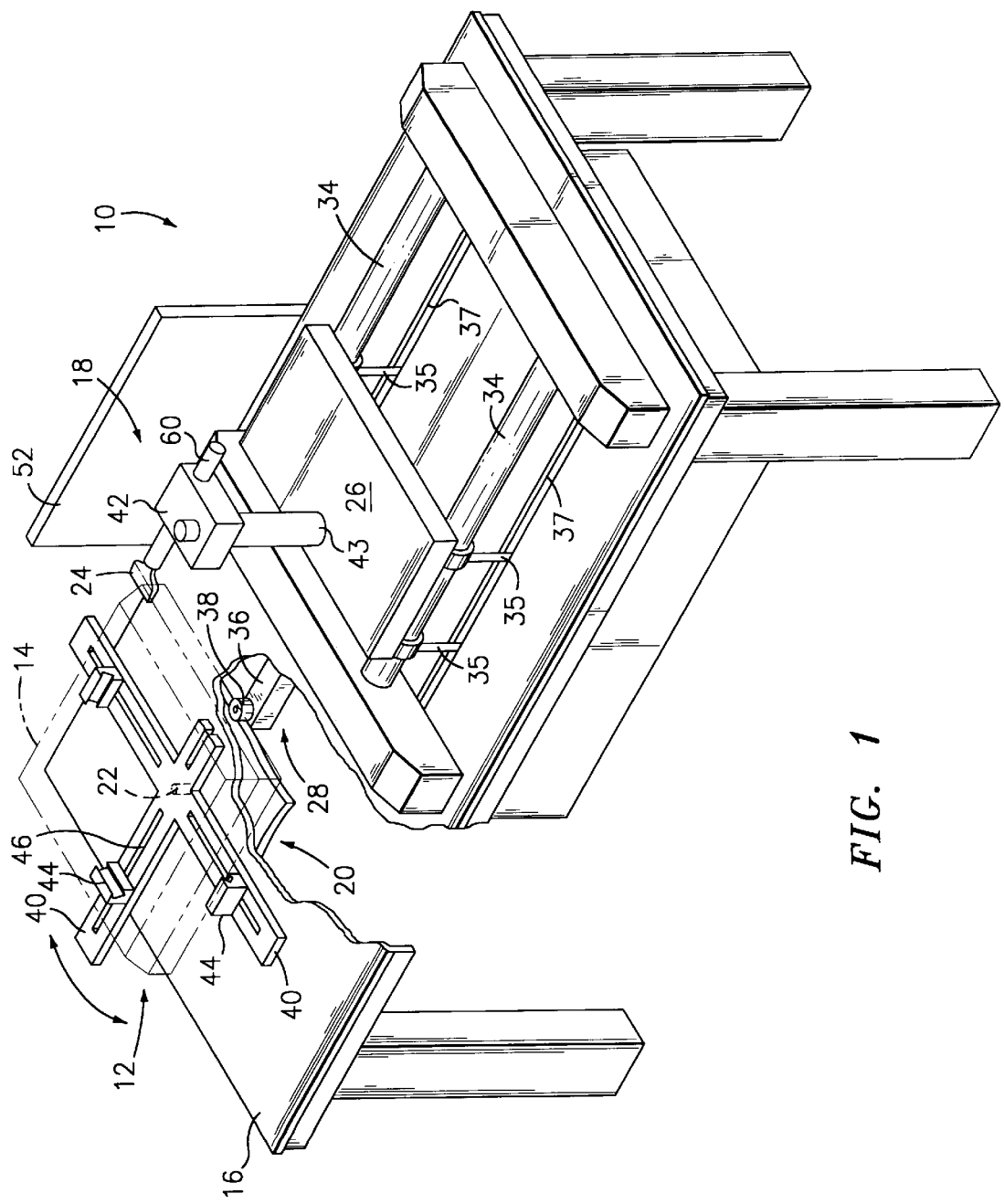
FIG. 1 is a perspective view, partially in section, of an apparatus for trimming articles according to the invention.

Referring now to the drawings, an apparatus for trimming blow molded plastic articles according to the present invention will be described. As discussed above, blow molded plastic articles typically have a sharp edge at a portion corresponding to the mold parting line edge. The present invention is directed to an apparatus for trimming this sharp edge with a stream of heated gaseous medium, especially air, so as to provide a trimmed edge in a safe and effective procedure.

The present invention is ideally suited to the trimming of blow molded square or rectangular plastic cases. Thus, the following disclosure and drawings illustrate the invention in terms of such plastic cases. Clearly, however, the teachings of the present invention are applicable to the heat trimming of any plastic article having an edge to be trimmed, especially non-round objects and/or objects having corners.

FIG. 1 shows a trimming apparatus according to the invention, generally indicated in the drawings as reference numeral 10.

A holding member 12 is provided for holding and supporting a workpiece 14. Holding member or holder 12 is preferably rotatably mounted on a platform or table 16. A trimming apparatus 18 is disposed on platform 16, in spaced relation to holder 12 and workpiece 14 supported thereon. Holder 12 serves to rotate workpiece 14 relative to trimming apparatus 18, so as to trim workpiece 14 as desired. Trimming apparatus 18 will also be described in detail below.

According to the invention, a cam member 20 is provided, preferably mounted on an axle 22 for rotation with holder 12. Cam member 20 serves to interact with trimming apparatus 18 and provide the proper positioning of trimming apparatus 18 relative to workpiece 14 during trimming.

Figure 2:
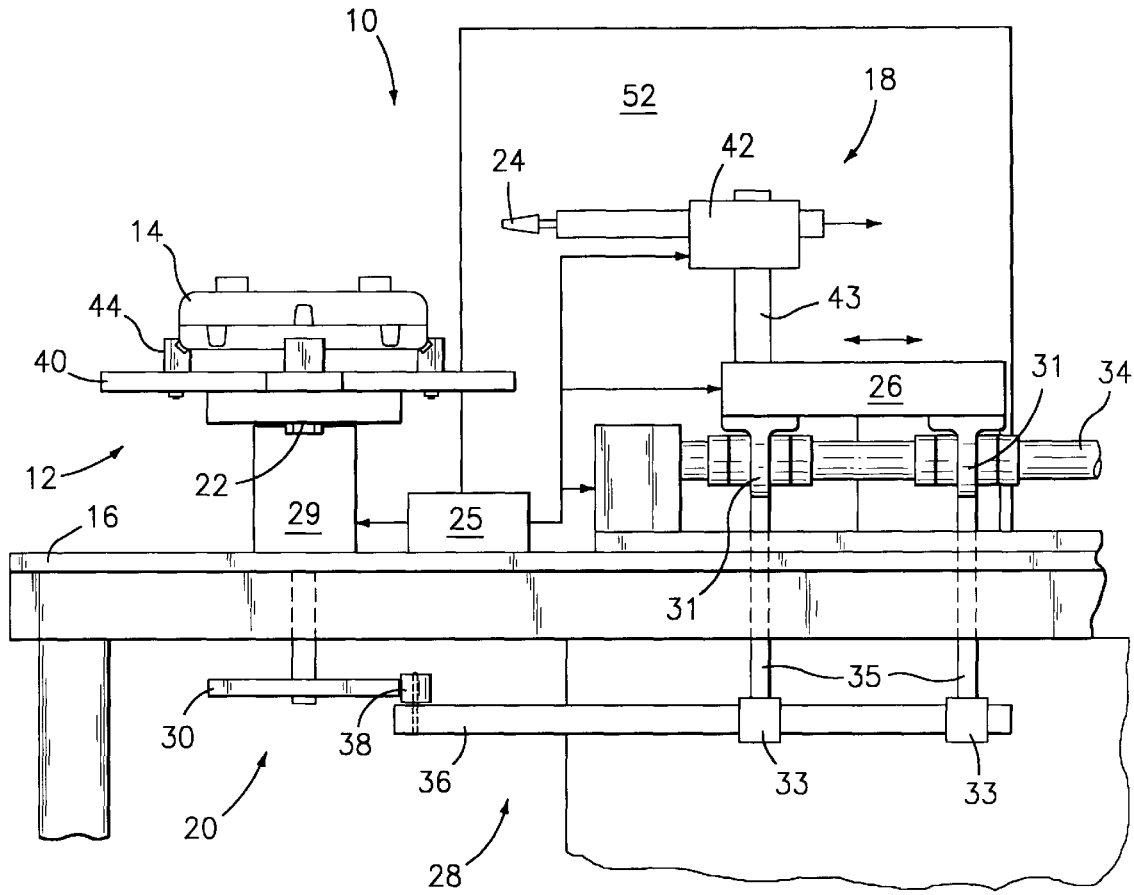
FIG. 2 is a side view of a portion of the apparatus of FIG. 1, according to the invention.

FIG. 2 shows a side view of an embodiment of apparatus 10 according to the invention, and shows trimming apparatus 18 having a nozzle 24 connected to a barrel 60 attached to a carriage assembly 26. Nozzle 24 serves to direct a heated stream of fluid or gaseous medium, especially air, toward the aforesaid sharp edges of workpiece 14. Impingement of the heated stream serves to melt and/or vaporize material at the sharp edges so as to provide a uniform, smooth rounded edge, advantageously without the use of combustible fuel such as propane and without an open combusted stream or flame from nozzle 24. Carriage 26 is preferably slidably mounted to platform 16 so as to be movable toward and away from holder 12. Carriage 26 is further preferably biased toward holder 12 and into engagement with cam member 20. In this manner, cam member 20 controls the position of nozzle 24 relative to workpiece 14. Carriage 26 may preferably have a cam follower 28 mounted thereto and disposed for interaction or engagement with cam member 20. Cam follower 28 may preferably be adjustably mounted or associated with carriage 26, for example using collars 33 attached to carriage 26 through arms 35 and releasably securable to arm 36 of cam follower 28 as shown. Also, it should be noted that although the drawings show two sets of arms 33 passing though two parallel slots 37 (See FIG. 1, also), arms 35 could also be provided in a single row passing through a single slot 37, preferably centered with arm 36, if desired.

As shown, holder 12 may suitably be rotatably mounted relative to table 16 and include a motor 29 or other structure for driving rotation of holder 12 on axle 22. As shown in FIG. 2, motor 29 may be mounted directly to table 16, with axle 22 extending upwardly for mounting of holder 12. Still referring to FIG. 2, axle 22 is also preferably downwardly extended through table 16 for positioning of cam member 20 as shown. In this embodiment, cam follower 28 associated with carriage 26 interacts with cam member 20 beneath table 16 so as to properly position carriage 16 relative to holder 12 as desired during rotation of cam member 20. Of course, positioning of cam member 20 and cam follower 28 beneath table 16 as shown in FIG. 2 is one preferred positioning of these elements. It should be noted that cam 20 and cam follower 28 could be positioned in other locations such as, for example, above table 16. Still further, cam 20 could be electronically generated and associated with a control member for positioning carriage 26 as desired according to the outer edge of the electronically generated image of rotating cam 20, all within the scope of the present invention.

Figure 3:
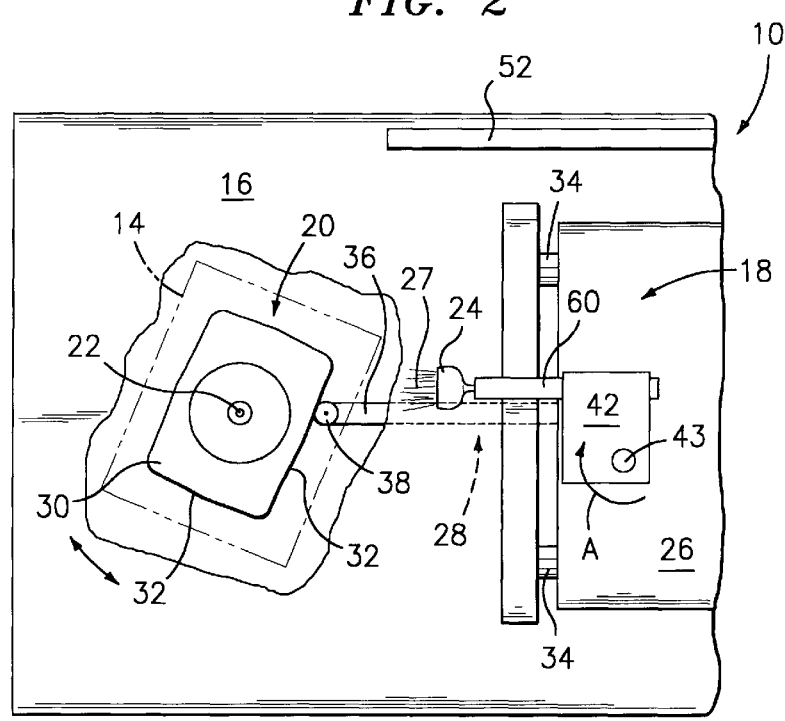
FIG. 3 is a top view of a portion of the apparatus of FIG. 1, partially in section, according to the invention.

FIG. 3 shows a top view of table 16, with holder 12 removed and workpiece 14 shown in phantom so as to further illustrate the structure and function of cam member 20. Cam member 20 preferably includes a cam 30 disposed on axle 22 so as to rotate with holder 12. Cam 30 is preferably a contoured plate, as shown in FIG. 2, having a contour selected according to the contour of workpiece 14. The contour of cam 30 is selected so as to interact with cam follower 28 and provide proper positioning of carriage 26 relative to holder 12, and, therefore, the proper positioning of nozzle 24 relative to a surface of workpiece 14 to be trimmed. It should be noted that torch 24 and barrel 60 are preferably mounted directly over or centered with respect to cam follower 28. These elements are shown laterally offset in FIGS. 3 and 8 so as to more fully show all elements.

It should be noted that while the preferred embodiment calls for holder 12 which rotates relative to a rotationally fixed nozzle 24, the teachings of the present invention could be employed so as to provide a fixed holding member and a nozzle 24 which rotates around the holding member to provide the relative rotation of the present invention.

As previously mentioned, the workpiece 14 shown in the drawings is a generally rectangular-shaped case. Cam 30 therefore has a corresponding shape or contour selected so as to guide cam follower 28, and therefore to guide nozzle 24 around the contour of a surface of workpiece 14 which is to be trimmed. Cam 30 is therefore preferably mounted relative to holder 12 for registry with a workpiece 14 to be held or supported thereon, that is, the sides of cam 30 are generally aligned with the sides of workpiece 14 supported by holder 12.

The length of cam follower 28 can be adjusted to provide proper spacing of nozzle 24 relative to workpiece 14, and thereby adjust the intensity of impingement of a stream 27 of heated air from nozzle 24 on workpiece 14. Also, cam 30 may be smaller or larger in size than workpiece 14, the difference in size being compensated by the length of cam follower 28. Alternatively, proper spacing of nozzle 24 relative to holder 12 and workpiece 14 can be provided by adjusting the position of carriage 26 relative to cam follower 28. Referring to FIG. 2, this could be accomplished by providing adjustable collars 31 releasably securable to cam follower 28 as shown. These collars 31 could be loosened in accordance with the invention so as to allow positioning of carriage 26 relative to cam follower 28 and then secured at the desired position. Of course, numerous other structures and means for providing adjustability of the spacing nozzle 24 relative to holder 12 will be readily apparent to one of ordinary skill in the art in light of the present disclosure.

Referring to FIG. 3, cam 30 may preferably have sides which are bowed outwardly toward center portions 32 thereof. This bowing of cam 30 helps to compensate for the angle of impingement of stream 27 from nozzle 24 on workpiece 14. As holder 12 rotates workpiece 14 relative to nozzle 24, stream 27 hits workpiece 14 at an angle near corners of cam 30 and workpiece 14. As center portions 32 of cam 30 rotate toward nozzle 24, stream 27 becomes more perpendicular to workpiece 14 and will, therefore, have a greater impact on this portion of workpiece 14. The bowing of center portions 32 of cam 30 serves to increase the distance between nozzle 24 and workpiece 14 as the angle of stream 27 approaches perpendicularity so as to compensate for this greater impact and provide an even trimming of workpiece 14.

Cam 30 is preferably removably mounted to axle 22 to facilitate changing, and holder 12 may also be removably mounted to axle 22, if desired, to allow greater access to motor 29, cam 30 and other elements of apparatus 10 as needed. In this manner, apparatus 10 can easily be adapted to workpieces of different size and shape by changing cam 30 as appropriate. This removable mounting may be achieved in any manner known in the art such as, for example, clips, bolts, screws, levers, or the like.

Trimming apparatus 18 may preferably be biased toward holder 12 through any means known in the art. Such biasing may be achieved, for example, by mounting carriage 26 on rails 34, and biasing carriage 26 with, for example, hydraulic means, mechanical members such as springs and the like, or in other manners known in the art.

Referring still to FIGS. 2–3, a preferred embodiment of cam follower 28 preferably includes an arm 36 mounted to carriage 26, and a wheel 38 rotatably disposed on arm 36. Biasing of carriage 26 toward holder 12 causes wheel 38 to contact cam 30. As cam 30 rotates, wheel 38 travels along the contour of cam 30, transmitting the rotation of cam 30 into the desired linear reciprocation of carriage 26.

It should be noted that holder 12 can alternatively be rotated through any means known in the art such as, for example, a driven belt acting upon a lower end of axle 22 (not shown) or numerous other configurations.

Figure 4:
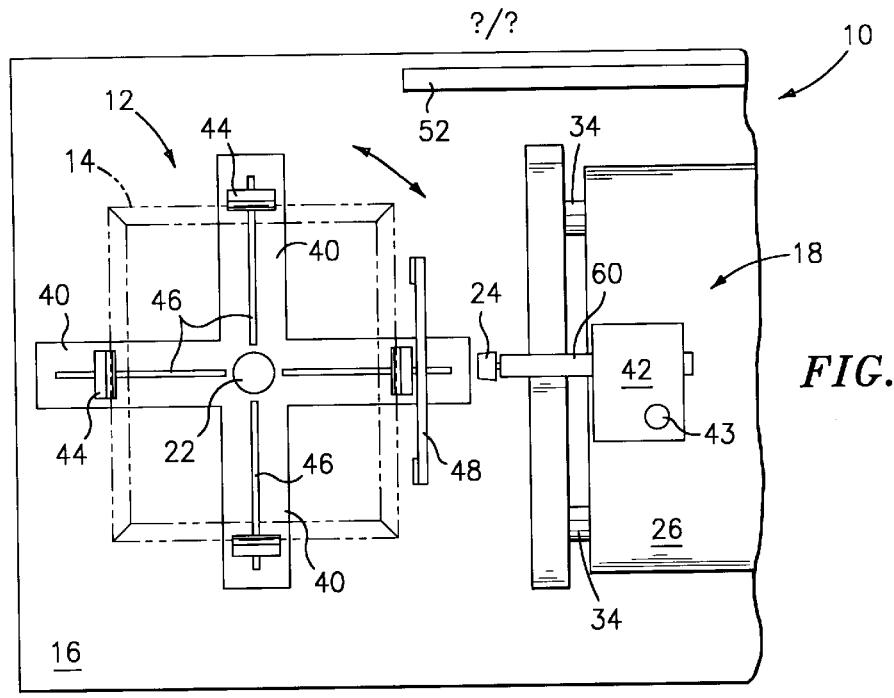
FIG. 4 is a top view of a preferred embodiment of a cross bar structure for use with a trimming apparatus according to the invention.

FIG. 4 illustrates a preferred embodiment of holder 12. As shown, holder 12 is preferably a substantially cross bar structure having a plurality of arms, each of which has a seat 44, preferably mounted in grooves 46 formed in arms 40. Seats 44 can be positioned in grooves 46 so as to be adjustable for workpieces of different size.

Typical workpieces have hinge or latch portions which should not or cannot be trimmed. Such portions would be damaged or destroyed by impingement of stream 27 from nozzle 24. According to a preferred embodiment of the invention, these portions are protected by one or more screen members 48 which may be adjustably positioned on holder 12. Screen members 48 may preferably be positioned on one or more seats 44 so as to shield desired portions of workpiece 14 from stream 27. Screen members 48 may extend along a substantial portion of a side of a workpiece, for example, where the case has a "living hinge" extending along a side, which must be protected. Screen member 48 may also be one or more smaller screen portions (not shown) which could be useful to protect several latches, or the like, on a workpiece.

Still referring to FIG. 4, nozzle 24 and barrel 60 are preferably movably mounted to carriage 26 so that nozzle 24 can be positioned relative to holder 12 to provide desired spacing relative to workpiece 14. In accordance with the invention, nozzle 24 may suitably be movably mounted relative to carriage 26 by mounting nozzle 24 and barrel 60 in a block member 42 which adjustably holds barrel 60, and by adjustably mounting block member 42 along a post 43 which may be mounted to carriage 26. Block member 42 may suitably have a substantially horizontally arranged bore 45 and a substantially vertically arranged bore 47. Barrel member 60 is preferably securably received within bore 45, while post 43 is preferably securably received within bore 47. In this manner, nozzle 24 can be vertically positioned relative to holder 12 by adjusting the position of block member 42 on post 43 and securing block 42 where desired, for example using set screws 49. Nozzle 24 may be horizontally positioned relative to holder 12 by positioning barrel 60 within bore 45 and securing barrel 60 where desired, also using set screws 49 or the like.

Still further, it may be desirable according to an alternative embodiment of the invention to mount nozzle 24 so as to be pivotable relative to carriage 26 so as to advantageously allow nozzle 24 to be pivoted away from a workpiece 14 positioned on holder 12, if desired. In accordance with this embodiment of the invention, post 43 may suitably be rotatably mounted to carriage 26 to allow pivot of block member 42 and nozzle 24 as shown, for example by arrow A in FIG. 3. This allows nozzle 24 to be pivoted away from turntable 12, for example in a cyclic fashion, based upon the time necessary for completely trimming a workpiece. Such cyclic pivoting of nozzle 24 could suitably be provided manually or through any control and motive means known in the art for providing timed pivoting of post 43 relative to carriage 26. The time required for treating a workpiece will be related to the contour of the workpiece and the speed of rotation of the turntable. Treatment time and command for pivot may be stored in a control member which will be described below. In this manner, the operation of apparatus 10 can be further automated as desired.

According to the embodiment of FIG. 4 wherein nozzle 24 can be pivoted away from holder 12, a shield 52 may preferably be disposed along table 16 in an area through which stream 27 from nozzle 24 travels when nozzle 24 is pivoted. Shield 52 serves to protect persons and equipment in the immediate area of the apparatus 10 from incidental damage or injury from nozzle 24. Alternatively, flow controlling structure could be provided for stopping flow when nozzle 24 is pivoted, or structure may be provided for blocking the stream from nozzle 24 as will be discussed below with respect to FIGS. 5 and 8.

Referring now to FIG. 2, apparatus 10 according to the invention may preferably be provided with a control member schematically shown at 25 for issuing commands and controlling operation of motor 29 for rotating holder 12, for proper positioning of nozzle 24 in one or more of the vertical, horizontal and rotational directions, for operation and synchronization of movement of carriage 26 and cam follower 28, and for controlling various other functions as desired in accordance with the invention. Control member 25 may suitably be programmed to set nozzle 24 to predetermined positions depending upon a type of workpiece to be treated. In this regard, control member 25 could be used to store a number of settings for workpieces of different size. Further, control member 25 may be programmed with a cycle or a treatment time, the completion of which results in pivot or other screening of nozzle 24 so as to allow removal of a treated workpiece and placement of a new workpiece to be treated. Control member 25 may also be adapted so as to control the flow and temperature of air from nozzle 24, for example through controlling the operation of an air compressor or other source to which nozzle 24 is connected, and by controlling the operation of a heater positioned within trimming apparatus 18 for heating air flowing from nozzle 24. In this regard, control member 25 may suitably be any type of programmable and/or preprogrammed control unit such as a personal computer, workstation, and the like, all of which are suitable for use in accordance with the present invention.

Figure 5:
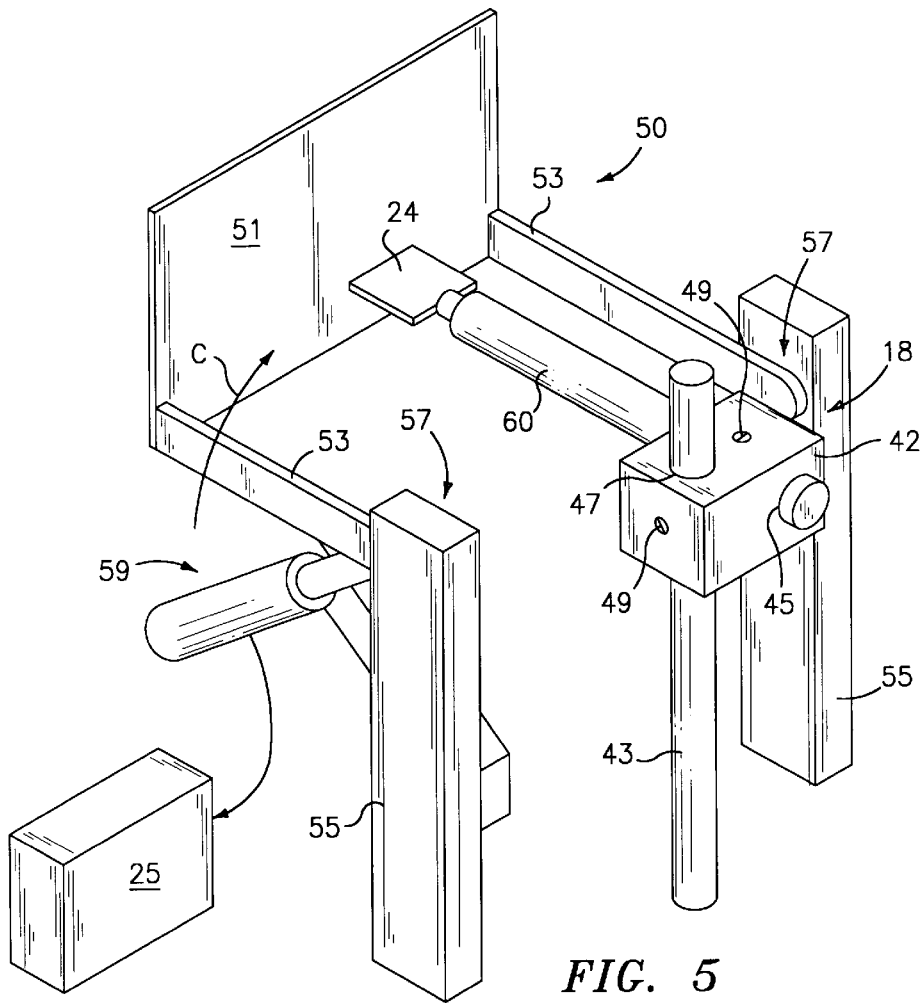
FIG. 5 is a perspective view of a shield member according to a preferred embodiment of the invention.

Referring to FIG. 5, a preferred embodiment of an apparatus 50 for selectively shielding nozzle 24 is illustrated. In accordance with this embodiment of the invention, a shield or plate 51 is provided, preferably mounted via arms 53 to posts 55. Posts 55 are preferably fixedly mounted with respect to trimming apparatus 18, for example through mounting posts 55 to carriage 26. Arms 53 are preferably pivotably connected to posts 55 at pivot connections 57, so as to allow pivot of screen 51 from the shielding position of FIG. 5 in the direction of arrow C to a removed position wherein screen 51 is removed from the path of stream 27 from nozzle 24. In accordance with the invention, structure may preferably be provided for automating or assisting in the pivot of screen 52 and arms 53 relative to posts 55. FIG. 5 shows a piston structure 59 associated with one arm 53 and post 55 for this purpose, and operatively associated with control member 25 for synchronizing operation of screen 51 with other steps in the process of trimming using apparatus 10 according to the invention. Advantageously, screen 51 can be positioned in the screening position of FIG. 5 as desired in accordance with the invention so as to block or deflect the flow of air from nozzle 24, for example while a trimmed workpiece is removed and the new workpiece placed on holder 12 as desired. As with the embodiment drawn to the laterally pivoting nozzle 24, discussed above, screen 51 may preferably be controlled by control member 25 so as to cyclically be positioned in the screening position as shown in FIG. 5 at the end of each pre-determined treatment cycle.

As set forth above, cam member 20 and cam follower 28 may comprise computer generated images, with carriage 26 being guided in position according to the computer generated images which may be generated for example by control member 25. In this embodiment, signals generated by the computer generated cam images are transmitted to motive means for carriage 26 so as to properly position nozzle 24 relative to workpiece 14.

Figure 6:
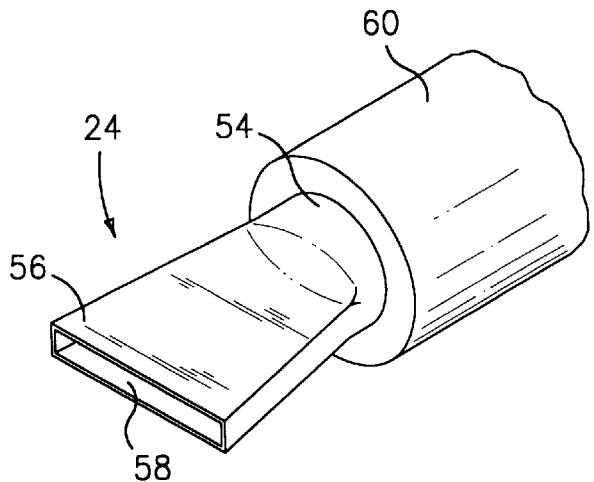
FIG. 6 is a perspective view of a heated air nozzle for use in an apparatus according to the invention.

Referring now to FIG. 6, a preferred embodiment of nozzle 24 according to the invention is illustrated. Nozzle 24 may suitably be a flow directing structure having an inlet 54 and an outlet 56. Inlet 54 is preferably communicated with a source of heated air under pressure (not shown in FIG. 6) and outlet 56 is preferably configured so as to direct and deliver a stream of heated air for impingement on a workpiece so as to melt and/or vaporize material from sharp edges of the workpiece as desired.

As shown, nozzle 24 may suitably have an outlet 56 having a slit or elongated substantially rectangular shaped opening 58 which advantageously serves to direct the stream of hot air over a narrow vertical profile so as to treat only the portion of workpiece 14 which is desired to be treated.

Figure 7:
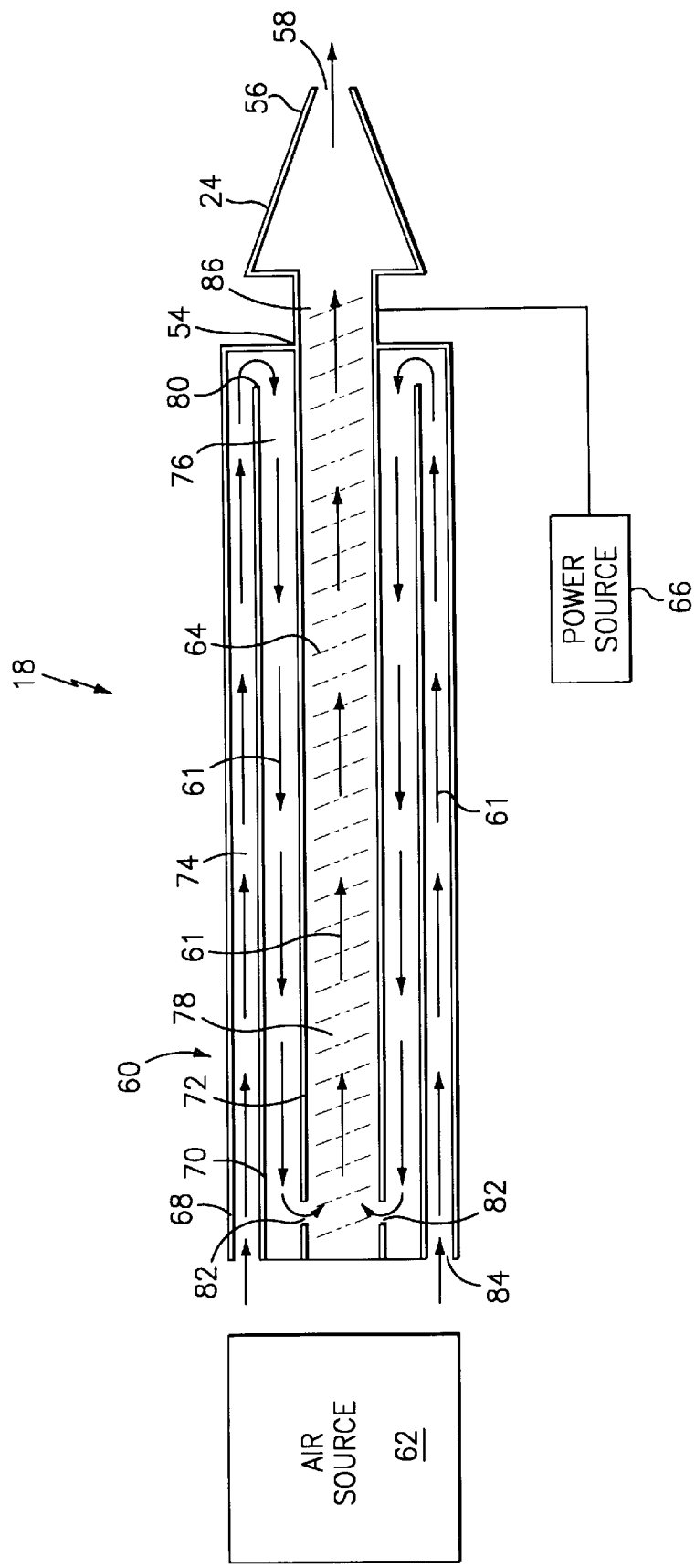
FIG. 7 is a sectional view of a preferred embodiment of the invention.

Referring now to FIG. 7, a side sectional view of trimming apparatus 18 is provided. As shown, nozzle 24 is preferably communicated with or connected to a flow member such as barrel member 60 which defines a path 61 (see arrows) for flow of gaseous medium such as air from an air source shown schematically at 62. A heater such as a heater coil shown schematically at 64 is preferably positioned within barrel 60 and associated with path 61 so as to heat air passing to nozzle 24 to a desired temperature. Heater 64 is preferably connected to any suitable power source, preferably an electric power source 66 as shown. by using an electric power source to generate heated air, it should be readily apparent that combustible fuel such as propane, open flame torches and the related enhanced safety precautions are all advantageously avoided through the apparatus of the present invention.

Still referring to FIG. 7, barrel 60 is preferably configured to define a multiple pass path, i.e., a path 61 which passes heater 64 several times. By defining at least two path segments passing heater 64, enhanced efficiency in heating air flowing through path 61 is obtained. For example, barrel 60 may suitably be provided as a plurality of substantially concentric tubes 68, 70, 72 defining annular spaces 74, 76 therebetween, and having inner space 78 within tube 72 containing heater 64. Annular spaces 74, 76 are preferably communicated for example around end 80 of tube 70, and annular space 76 may suitably be communicated with inner space 78 through passages 82 in the wall of tube 72. In this embodiment, barrel 60 preferably has an inlet 84 at an end of annular space 74 and an outlet 86 at an end of inner space 78. In this way, barrel member 60 defines a three pass path 61 wherein air is heated as it flows inwardly toward inner space 78 and, advantageously, the outside wall of barrel member 60 (tube 68) remains relatively cool while air heated to the desired temperature flows out of inner space 78 to nozzle 24.

Heater 64 serves to provide air at a desired temperature for trimming, which for workpieces made of HDPE is preferably a temperature of at least about 130° F., more preferably between about 175° F. to about 200° F. It is believed that favorable trimming is obtained from a combination of heat and pressure from the stream of air, and air may suitably be provided to trimming apparatus at an input pressure of about 100 psi. Without being bound by any specific theory, it is believed that the appropriate combination of pressure and temperature serves to melt and/or vaporize material from sharp edges to be trimmed.

Figure 8:
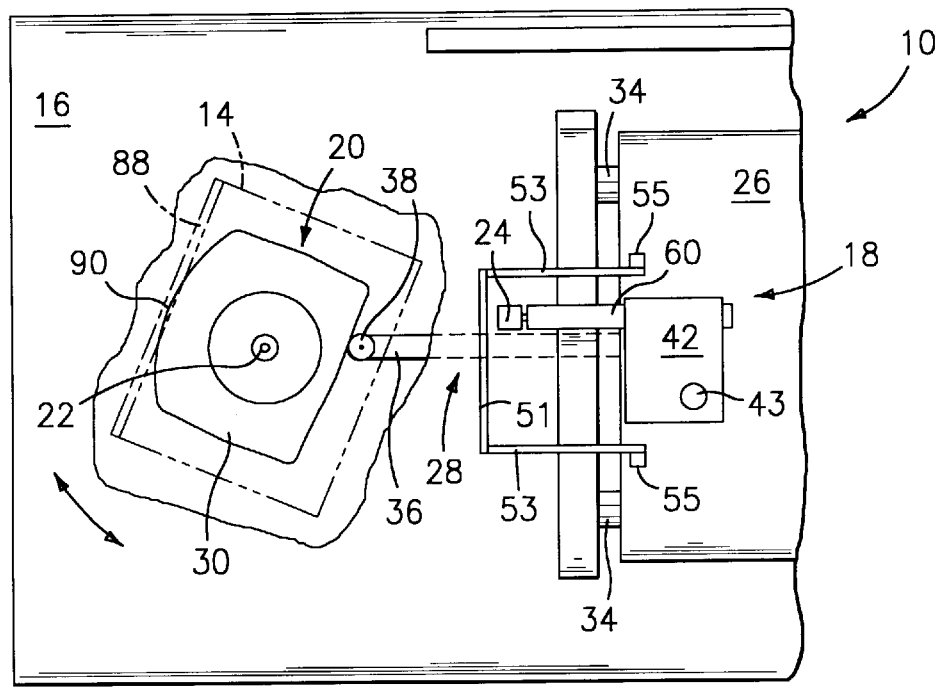
FIG. 8 is a top view partially in section to illustrate a preferred cam member according to the invention.

As set forth above, certain portions of a workpiece may not need to be trimmed or may be physically incapable of withstanding trimming. Referring to FIG. 8, an example of such a portion is a hinge area 88 of a molded plastic case workpiece 14 (shown in phantom). As set forth above, portions such as hinge area 88 may be shielded from impingement from nozzle 24. Alternatively, as shown in FIG. 8, cam 30 may preferably be provided with an extending portion 90 for positioning in registry with hinge area 88 as shown. In this manner, advantageously, nozzle 24 is positioned at a first spacing between nozzle 24 and workpiece 14 shown in FIG. 8 during trimming, and extending portion 90 serves to increase the spacing of nozzle 24 from hinge area 88 so as to avoid treatment of this portion of workpiece as desired.

With general reference now to the drawings, the operation of an apparatus according to the invention will be described.

A workpiece 14 is positioned on holder 12. Holder 12 is then set to rotating. After holder 12 "cues" to a starting position, nozzle 24 is pivoted into position and flow of air through nozzle 24 is heated by heater 64 and directed by nozzle 24 so as to impinge a stream 27 of heated air on the sharp edge of workpiece 14. Nozzle 24 is biased into position through carriage 26, and follows the contours of workpiece 14 due to cam follower 28 following the contour of cam 30. The rotation speed of holder 12 sets a predetermined time which will be necessary to completely trim a workpiece. In this embodiment screen 51 is preferably set to pivot into a screening position relative to nozzle 24 upon the expiration of this time, and holder 12 preferably stops rotating at this point, so that trimmed workpiece 14 can be removed and replaced by the next workpiece to be trimmed. Once the next workpiece is in place, the holder is again started and cued, and screen 51 is moved away from nozzle 24 for trimming. This procedure is repeated as desired.

Alternatively, nozzle 24 may be pivoted as discussed above, or supply of air to nozzle 24 may simply be blocked at desired intervals to allow changing of the workpiece as needed, all within the broad scope of the present invention.

It is clear that the apparatus as disclosed provides trimming of workpieces wherein quality is uniform, labor costs are minimized, and risk of injury to workers is reduced. Further, the need for combustible fuel and an open flame torch is completely avoided along with the additional burden of strict safety standards concomitant therewith.

This invention may be embodied in other forms or carried out in other ways without departing from the spirit or essential characteristics thereof. The presently described embodiments are therefore to be considered as in all respects illustrative and not restrictive, the scope of the invention being indicated by the appended claims, and all changes which come within the meaning and range of equivalency are intended to be embraced therein.

What is claimed is:

1. An apparatus for trimming sharp edges for a non-round workpiece having a contour, comprising:

means for electrically heating a stream of gaseous medium so as to provide a stream of heated gaseous medium;

means for trimming the workpiece by impinging said stream of heated gaseous medium on the workpiece in the absence of flame;

cam means for guiding said means for trimming relative to said means for holding, said cam means cooperating said means for holding with said means for trimming so that said means for trimming follows said contour of the workpiece when said means for holding is rotated relative to said means for trimming, wherein said cam means has a cam contour which is operatively associated with said means for trimming the workpiece, and wherein said cam means is mounted for rotation with said means for holding so that said contour rotates with said means for holding relative to said means for trimming, wherein the workpiece has a portion which is not to be trimmed, and wherein said cam means comprises means for positioning said means for trimming away from said portion, wherein said cam means comprises a cam mounted to said means for holding for rotation therewith, said cam having said cam contour selected to guide said means for trimming at a spacing of said means for trimming from said contour of the workpiece, and wherein said cam contour includes an extended portion in registry with said portion of the workpiece which is not to be trimmed, said extended portion serving to increase said spacing of said means for trimming from said contour of the workpiece at said portion which is not to be trimmed.

2. An apparatus according to claim 1 wherein said means for trimming the workpiece comprises a nozzle for directing a stream of heated gaseous medium.

3. An apparatus according to claim 2, wherein said nozzle member further comprises gaseous medium supply means for defining a flow path associated with a source of said gaseous medium under pressure, and wherein said means for electrically heating is positioned along said flow path for heating said gaseous medium in said flow path.

4. An apparatus according to claim 3, wherein said flow path is defined relative to said means for electrically heating so that said gaseous medium flowing along said flow path passes said means for electrically heating at least twice.

5. An apparatus according to claim 1, wherein said means for trimming generates a stream of heated gaseous medium at a temperature of at least about 130° F.

6. An apparatus according to claim 5, wherein said temperature is between about 175° F. to about 200° F.

7. An apparatus according to claim 1, wherein said cam means includes a cam mounted for rotation with said means for holding.

8. An apparatus according to claim 7, wherein said means for holding is a support member mounted for rotation on an axle, said cam being mounted on said axle in registry with said support member.

9. An apparatus according to claim 8, wherein said cam comprises a contoured plate mounted on said axle and having a contour selected according to said contour of the workpiece.

10. An apparatus according to claim 9, wherein said contoured plate is removably mounted to said axle whereby said contoured plate can readily be changed to accommodate workpieces of different contour.

11. An apparatus according to claim 9, wherein surfaces of said contoured plate which correspond to substantially flat surfaces of the workpiece are outwardly bowed.

12. An apparatus according to claim 9, wherein said means for trimming comprises a nozzle mounted on a carriage and associated with a source of heated gaseous medium under pressure, a cam follower mounted on said carriage and disposed in registry with said cam, and means for biasing said carriage toward said cam, whereby said cam follower is biased against said contour of said contoured plate.

13. An apparatus according to claim 12, wherein said cam follower comprises an arm mounted on said carriage and having a wheel rotatably mounted on said arm, said wheel being biased against said contoured plate by said biasing means.

14. An apparatus according to claim 12, wherein said means for trimming is pivotally mounted to said carriage for pivot away from a workpiece on the support member.

15. An apparatus according to claim 14, wherein treatment of each workpiece takes a treatment time, said apparatus further comprising means for pivoting said means for trimming away from the workpiece upon expiration of said treatment time.

16. An apparatus according to claim 1, further comprising shield means for selectively shielding the means for trimming, the shield means being movably associated with the means for trimming between a shielding position wherein the shield means is positioned to block the stream of heated gaseous medium and an operating position wherein the shield means is positioned substantially out of the stream of heated gaseous medium.

17. An apparatus according to claim 16, wherein the shield means comprises a shield member pivotably mounted relative to the means for trimming between the shielding position and the operating position.

18. An apparatus according to claim 17, wherein treatment of each workpiece takes a treatment time, said apparatus further comprising means for positioning the shield member to the shielding position upon expiration of the treatment time.

19. An apparatus according to claim 1, further comprising means for vertically adjusting position of the means for trimming relative to the means for holding.

20. An apparatus according to claim 19, further comprising means for horizontally adjusting position of the means for trimming relative to the means for holding.

21. An apparatus according to claim 1, further comprising means for horizontally adjusting position of the means for trimming relative to the means for holding.

22. An apparatus according to claim 1, wherein the workpiece has a portion which is not to be trimmed, the apparatus further comprising shield means disposed on said means for holding so as to shield said portion of the workpiece from said means for trimming.

23. An apparatus for trimming sharp edges from a non-round workpiece having a contour and a portion which is not to be trimmed, comprising:

means for trimming the workpiece;

means for holding the workpiece, said means for holding being rotatably mounted relative to said means for trimming;

cam means for guiding said means for trimming, said cam means comprising a cam mounted relative to said means for holding for rotation therewith, said cam having a cam contour selected to guide said means for trimming at a spacing of said means for trimming from said contour of the workpiece, said cam contour including an extended portion in registry with said portion of the workpiece which is not to be trimmed, said extended portion serving to increase said spacing of said means for trimming from said contour of the workpiece at said portion which is not to be trimmed.

24. An apparatus according to claim 23 wherein said means for trimming the workpiece comprises a nozzle for directing a stream of heated gaseous medium.

25. An apparatus according to claim 24, wherein said nozzle further comprises gaseous medium supply means for defining a flow path associated with a source of said gaseous medium under pressure, and heater means positioned along said flow path for heating said gaseous medium in said flow path.

26. An apparatus according to claim 25, wherein said flow path is defined relative to said heater means so that said gaseous medium flowing along said flow path passes said heater means at least twice.

27. An apparatus according to claim 25, wherein said heater means is an electric heater.

28. An apparatus according to claim 23, wherein said means for trimming generates a stream of heated gaseous medium at a temperature of at least about 130° F.

29. An apparatus according to claim 28, wherein said temperature is between about 175° F. to about 200° F.

* * * * *